United States Patent
Ji et al.

(10) Patent No.: US 10,928,533 B2
(45) Date of Patent: Feb. 23, 2021

(54) IDENTIFYING POTENTIAL HYDROCARBON TRAPS IN A SUBTERRANEAN REGION USING RECURSIVE ANISOTROPIC EROSION OF SEISMIC DATA

(71) Applicant: Saudi Arabian Oil Company, Dhahran (SA)

(72) Inventors: Xu Ji, Dhahran (SA); Yuxiang Wang, Beijing (CN)

(73) Assignee: Saudi Arabian Oil Company, Dhahran (SA)

(*) Notice: Subject to any disclaimer, the term of this patent is extended or adjusted under 35 U.S.C. 154(b) by 198 days.

(21) Appl. No.: 16/393,169

(22) Filed: Apr. 24, 2019

(65) Prior Publication Data
US 2020/0341160 A1    Oct. 29, 2020

(51) Int. Cl.
| | |
|---|---|
| *G06G 7/48* | (2006.01) |
| *G01V 1/30* | (2006.01) |
| *E21B 49/00* | (2006.01) |
| *G01V 1/28* | (2006.01) |
| *G01V 1/34* | (2006.01) |
| *G06G 7/50* | (2006.01) |

(52) U.S. Cl.
CPC .............. *G01V 1/302* (2013.01); *E21B 49/00* (2013.01); *G01V 1/282* (2013.01); *G01V 1/345* (2013.01)

(58) Field of Classification Search
CPC ........ G01V 1/302; G01V 1/282; G01V 1/345; E21V 49/00
See application file for complete search history.

(56) References Cited

U.S. PATENT DOCUMENTS

| | | |
|---|---|---|
| 5,321,612 A | 6/1994 | Stewart |
| 6,725,174 B2 | 4/2004 | Bouts et al. |
| 7,769,546 B2 | 8/2010 | Lomask et al. |
| 8,213,261 B2 | 7/2012 | Imhof et al. |
| 9,194,968 B2 | 11/2015 | Imhof et al. |
| 2002/0013687 A1 | 1/2002 | Ortoleva |
| 2003/0112704 A1 | 6/2003 | Goff et al. |
| 2009/0265152 A1 | 10/2009 | Cacas et al. |
| 2011/0295510 A1 | 12/2011 | Gulati |
| 2013/0064040 A1* | 3/2013 | Imhof ................ G01V 1/30 367/73 |
| 2013/0338987 A1 | 12/2013 | Cheng et al. |
| 2015/0073715 A1 | 3/2015 | Aarre |
| 2016/0047926 A1 | 2/2016 | Wallet |

(Continued)

OTHER PUBLICATIONS

Guillen et al., "Detecting salt body using texture classification," presented at the 14th International Congress of the Brazilian Geophysical Society, Rio de Janiero, Brazil, Aug. 3-6, 2015, 5 pages.

(Continued)

*Primary Examiner* — Andre Pierre Louis
(74) *Attorney, Agent, or Firm* — Fish & Richardson P.C.

(57) ABSTRACT

Systems and methods for identifying potential hydrocarbon traps in a subterranean region can include: receiving seismic data of the subterranean region, the seismic data acquired by at least one seismic sensor, the seismic data indicating positions of physical barriers to hydrocarbon flow in the subterranean region and using anisotropic lateral and upward erosion to identify possible locations of hydrocarbons.

20 Claims, 8 Drawing Sheets

(56) References Cited

U.S. PATENT DOCUMENTS

2016/0377752 A1* 12/2016 Cavelius ............... G01V 1/302
                                                   702/16
2018/0024263 A1*  1/2018 Aarre .................... G01V 1/364
                                                   367/43

OTHER PUBLICATIONS

Monsen et al., "Segmentation of seismic data with complex stratigraphy using watershedding—preliminary results," Digital Signal Processing Workshop, Oct. 13-16, 2002, 4 pages.
Xiong et al., "Seismic fault detection with convolutional neural network," Geophysics, Sep. 2018, 82(5):97-103.
PCT International Search Report and Written Opinion in International Appln. No. PCT/US2020/029610, dated Aug. 3, 2020, 15 pages.
Sheriff and Geldart, "Exploration Seismology," 2nd Edition, Cambridge University Press, Oct. 1995, 3 page.

* cited by examiner

IDENTIFYING POTENTIAL HYDROCARBON TRAPS IN A SUBTERRANEAN REGION USING RECURSIVE ANISOTROPIC EROSION OF SEISMIC DATA

TECHNICAL FIELD

This disclosure relates to identifying potential hydrocarbon traps in a subterranean region.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications such as, for example, identification of potential petroleum reservoirs. Seismic surveys are conducted by using a controlled seismic source (for example, a seismic vibrator or dynamite) to create a seismic wave. In land-based seismic survey, the seismic source is typically located at ground surface. The seismic wave travels into the ground, is reflected by subsurface formations, and returns to the surface where it is recorded by sensors called geophones. The geologists and geophysicists analyze the time it takes for the seismic waves to reflect off subsurface formations and return to the surface to map sedimentary facies and other geologic features. This analysis can also incorporate data from sources such as, for example, borehole logging, gravity surveys, and magnetic surveys. In undersea seismic surveys, the seismic source is typically towed behind a vessel.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

Potential hydrocarbon traps in a subterranean region can identified using recursive anisotropic erosion of seismic data representing the subterranean region. The systems and methods described in this disclosure have demonstrated the ability to automatically recognize and locate potential structural traps that can retain hydrocarbons such as oil and gas.

This approach is based on an algorithm called anisotropic erosion. Erosion is one of the basic operators in mathematical morphology. The basic effect of the operator on an image is to erode away the boundaries of regions of foreground pixels or voxels. Anisotropic erosion is a special type of erosion that only erodes away the boundaries on certain directions. In contrast to soil erosion modeling, the systems and methods implementing this approach only allow erosion to occur laterally and upwards. The lateral and upwards erosion is limited by barriers representing physical barriers such as, for example, impermeable layers and faults present in the subterranean region.

The anisotropic erosion system can communicate with a structural model of the subterranean region developed using seismic surveys and associated investigation techniques. Output from the anisotropic erosion system can be used to enhance the structural model of the subterranean region, to provide graphical representations of possible hydrocarbon traps, and to guide further characterization activities such as, for example, drilling test wells.

In some aspects, methods for identifying potential hydrocarbon traps in a subterranean region implemented by one or more data processing apparatus include:
  receiving seismic data of the subterranean region, the seismic data acquired by at least one seismic sensor, the seismic data indicating positions of physical barriers to hydrocarbon flow in the subterranean region;
  creating a representation of the subterranean region and labeling voxels at the positions of the physical barriers as impermeable;
  labeling voxels in the representation of the subterranean region not marked as impermeable as possible hydrocarbon;
  using anisotropic lateral and upward erosion to change labels of voxels from possible hydrocarbon to not possible hydrocarbon;
  iterating the anisotropic lateral and upward erosion until no change occurs between one iteration and the next iteration; and
  providing identification of the voxels labeled as possible hydrocarbons as output.

In some aspects, computer-implemented systems include a computer memory; and a hardware processor interoperably coupled with the computer memory and configured to perform operations. The operations include:
  receiving seismic data of the subterranean region, the seismic data acquired by at least one seismic sensor, the seismic data indicating positions of physical barriers to hydrocarbon flow in the subterranean region;
  creating a representation of the subterranean region and labeling voxels at the positions of the physical barriers as impermeable;
  labeling voxels in the representation of the subterranean region not marked as impermeable as possible hydrocarbon;
  using anisotropic lateral and upward erosion to change labels of voxels from possible hydrocarbon to not possible hydrocarbon;
  iterating the anisotropic lateral and upward erosion until no change occurs between one iteration and the next iteration; and
  providing identification of the voxels labeled as possible hydrocarbons as output.

Embodiments of these systems can include one or more of the following features.

In some embodiments, methods and systems include performing connectivity clustering on the voxels labeled as possible hydrocarbons in the output and assigning common reservoir trap identifiers to connected voxels. In some cases, methods and systems include using the output as input to a reservoir model. In some cases, methods and systems include adjusting at least one parameter of the reservoir model based on geological knowledge of formations in the subterranean region. In some cases, the at least one parameter of the reservoir model comprises reservoir thickness.

In some embodiments, the representation is a two-dimensional representation.

In some embodiments, the representation is a three-dimensional representation.

In some embodiments, the physical barriers include faults. In some cases, the physical barriers include horizons limiting flow of hydrocarbons.

In some embodiments, the output comprises a graphical representation of the voxels identified as possible hydrocarbon in the output. In some cases, the graphical representation comprises a two-dimensional display with a first color representing voxels labeled as not possible hydrocarbon and a different color or colors representing possible hydrocarbons.

In some embodiments, methods and systems include drilling a well to a location in the subterranean region corresponding to voxels identified as possible hydrocarbon in the output.

These systems and methods have successfully identified and highlighted potential structural traps in synthetic and actual data sets representing subterranean regions. By incorporating three-dimensional anisotropic erosion, these systems and methods reduce human bias and the limitations associated with the two-dimensional visualizations of the subterranean region used in manual identification of potential structural traps. In addition, these systems and methods significantly reduce the time required to perform identification of potential structural traps.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods that use recursive anisotropic erosion of seismic data representing a subterranean region to identify potential hydrocarbon traps in the subterranean region. The systems and methods described in this disclosure have demonstrated the ability to automatically recognize and locate potential structural traps that can retain hydrocarbons such as oil and gas.

The anisotropic erosion system can communicate with a structural model of the subterranean region developed using seismic surveys and associated investigation techniques. Output from the anisotropic erosion system can be used to enhance the structural model of the subterranean region, to provide graphical representations of possible hydrocarbon traps, and to guide further characterization activities such as, for example, drilling test wells.

Figure 1:
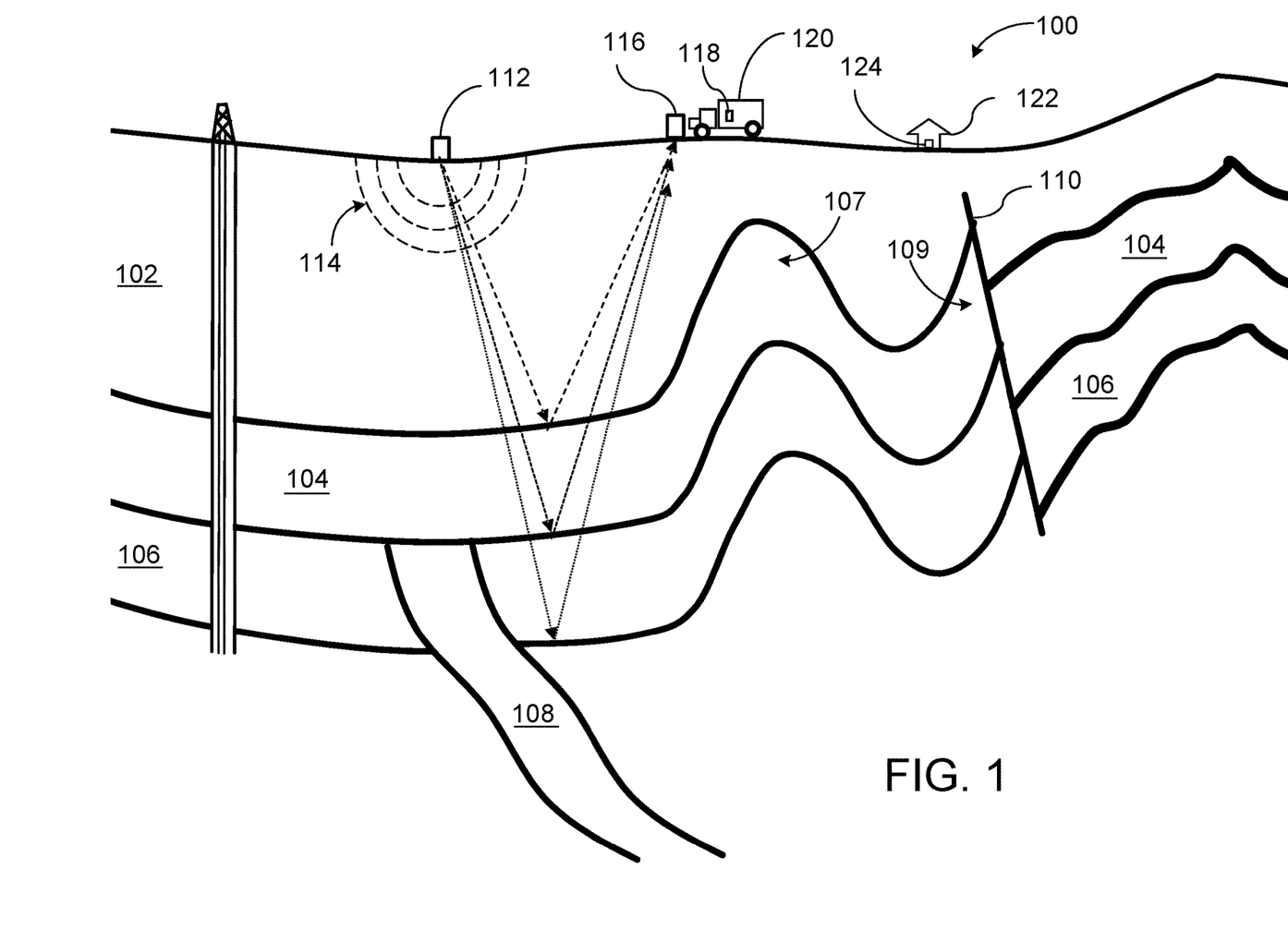
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Mapping these subterranean features is an important part of identifying locations that are likely to hold hydrocarbons. Heat and pressure cause carbon in source rocks to evolve over time into hydrocarbons. These hydrocarbons tend to migrate laterally and upwards into reservoir rock formations. These hydrocarbons gather where this migration is stopped by physical barriers such as the layer of impermeable cap rocks 102, that is, where the hydrocarbons are trapped. For example, the subterranean formation 100 has an anticline trap 107 and a fault trap 109 where hydrocarbons might be found.

A seismic source 112 (for example, a seismic vibrator or an explosion) generates seismic waves 114 that propagate in the earth. The velocity of these seismic waves depends properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interface reflects some of the energy of the seismic wave and refracts part of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output such as, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2:
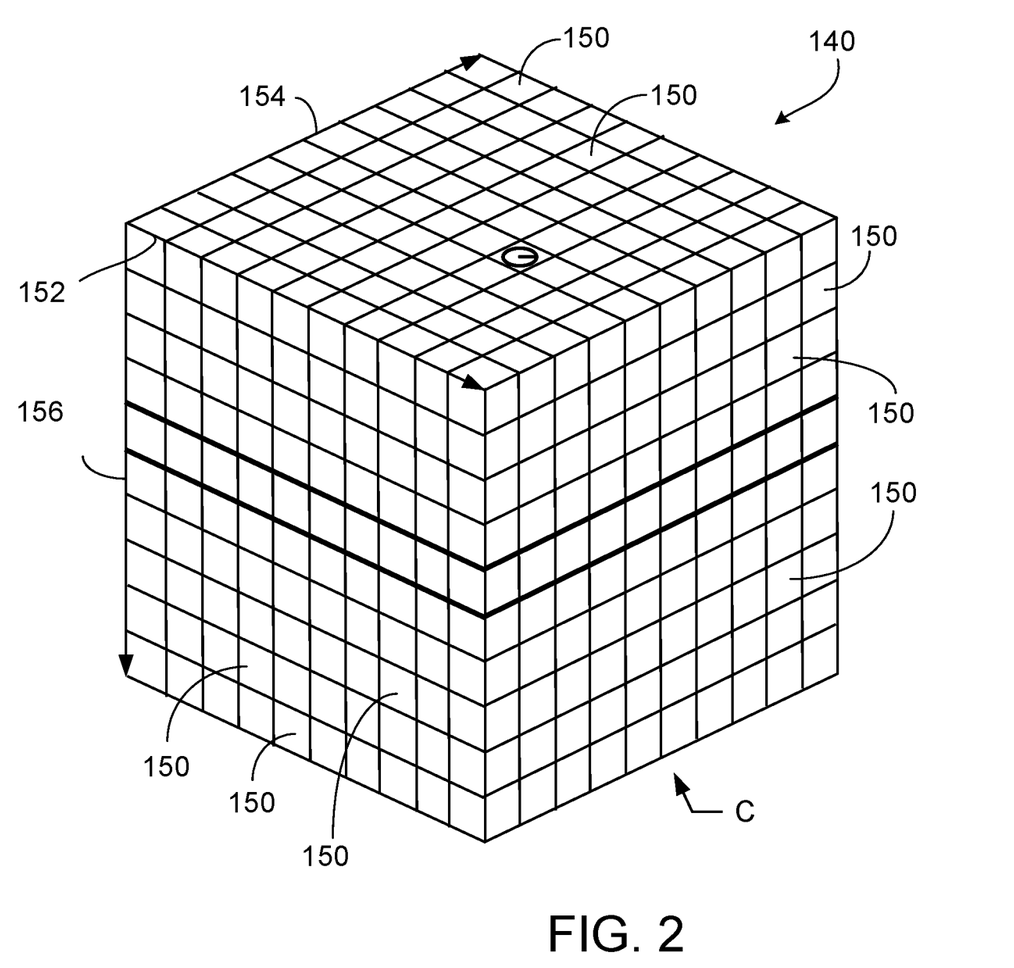
FIG. 2 illustrates a framework for a three-dimensional representation of the subterranean region where the seismic survey was performed.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a Delta-X spacing 152, a Delta-Y offset spacing 154, and a Delta-Offset offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
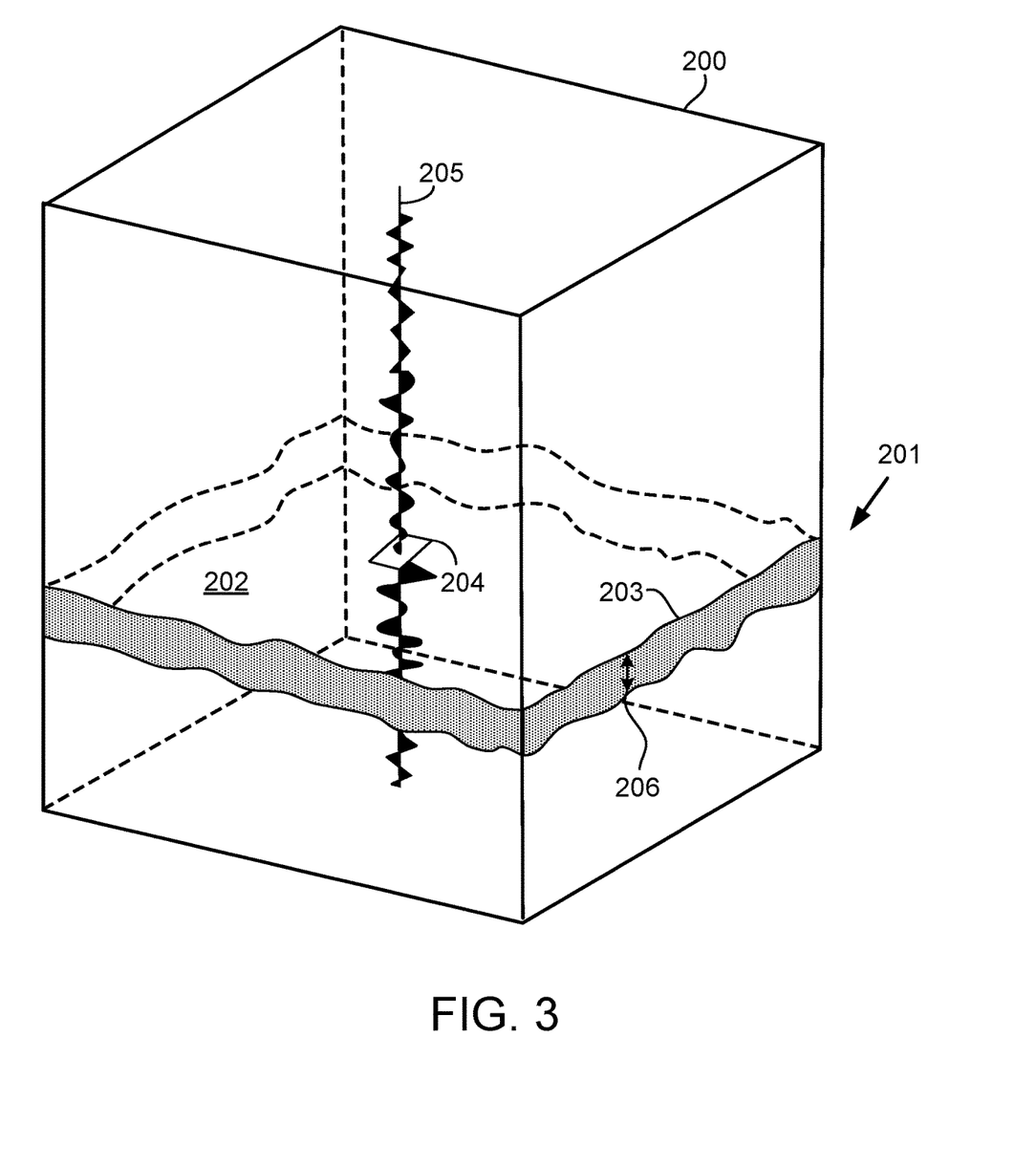
FIG. 3 illustrates a stratigraphic trace within the three-dimensional representation of the subterranean region.

FIG. 3 illustrates a seismic cube 200 representing a formation. The seismic cube has a stratum 201 based on a surface (for example, amplitude surface 202) and a stratigraphic horizon 203. The amplitude surface 202 and the stratigraphic horizon 203 are grids that include many cells such as exemplary cell 204. Each cell is a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window.

Horizons and faults are identified or picked based on interpretation of this seismic data. Once these faults and horizons are picked, the associated data (for example, location) can be incorporated in a structural model of the formation, stored in data file, or both. This data is used as input for systems and methods described in this disclosure that use recursive anisotropic erosion of seismic data representing a subterranean region to identify potential hydrocarbon traps in the subterranean region.

FIG. 4A-4H schematically illustrate a two-dimensional example of anisotropic erosion being used to identify potential hydrocarbon traps in a subterranean region. A two-dimensional synthetic data set was generated that included synthetic faults and horizons to create some structural traps. A prototype trap identification system successfully identified and highlighted these structural traps.

The system included an anisotropic erosion module, a connectivity clustering module, and a reservoir model. The system receives the seismic data including data indicating positions of physical barriers to hydrocarbon flow in the subterranean region. The anisotropic erosion module creates a representation of the subterranean region. This representation is an empty data volume representing the underground area to be investigated as a workspace for the subsequent analysis. The anisotropic erosion module creates this representation based on the received seismic data. In some implementations, anisotropic erosion modules create this representation based on dimensions of the area/volume being investigated provided as input before the seismic data is received.

The anisotropic erosion module was implemented with a state variable which identifies whether a voxel is impermeable ($sv=0$), possible hydrocarbon ($sv=1$), or not possible hydrocarbon ($sv=2$). The representation of the subterranean region is initialized with all voxels identified as not possible hydrocarbon—that is, with their state variables set to 2. Based on the data indicating positions of physical barriers to hydrocarbon flow in the subterranean region, the anisotropic erosion module identifies specific voxels as impermeable by switching their state variable to 0. The prototype anisotropic erosion module then switches all voxels not labeled as impermeable ($sv=0$) to indicate possible hydrocarbon ($sv=1$). In some implementations, the representation of the subterranean region is initialized with all voxels identified as possible hydrocarbon ($sv=1$) before the barrier voxels are labeled as impermeable ($sv=0$).

Figure 4A:
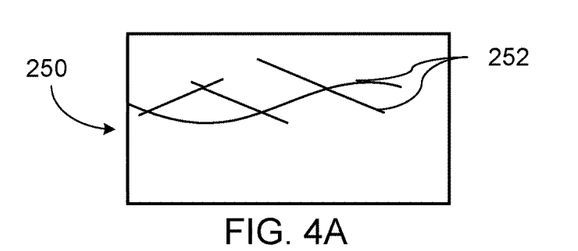
FIGS. 4A-4H schematically illustrate a two-dimensional example of anisotropic erosion being used to identify potential hydrocarbon traps in a subterranean region.

FIG. 4A shows the representation 250 of the subterranean region with the voxels representing barriers 252 indicated by lines. The voxels labeled as not possible hydrocarbon ($sv=2$) are shown as clear.

Figure 4B:
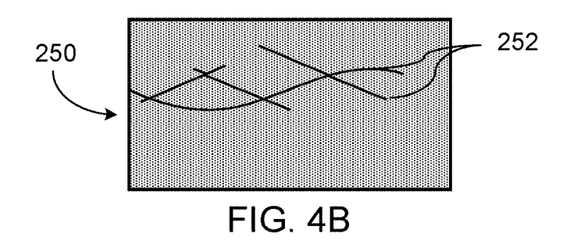
Figure 4C:
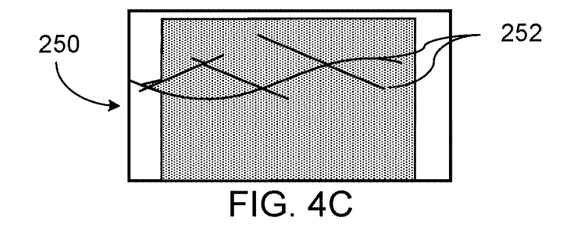
Figure 4D:
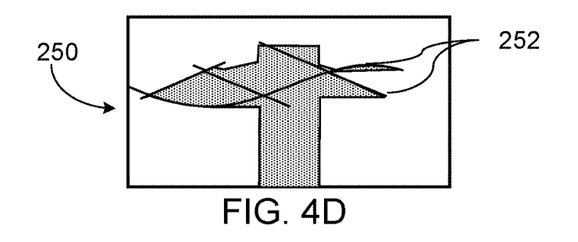
Figure 4E:
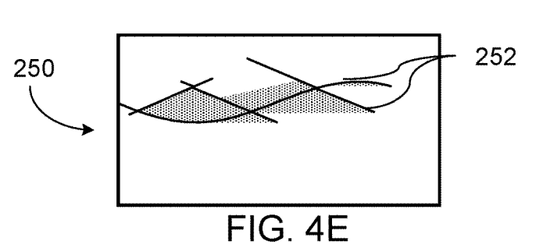
Figure 4F:
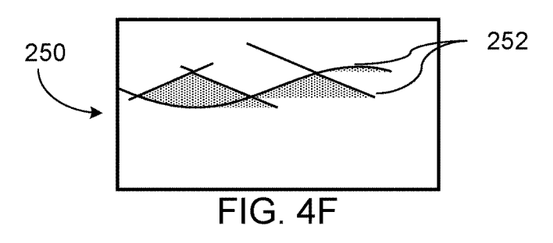

As shown in FIG. 4B, the anisotropic erosion module then labeled all voxels in the representation 250 of the subterranean region not labeled as impermeable 252 as possible hydrocarbon. These voxels are shown as shaded in the display.

FIGS. 4C-4F show the effect of anisotropic erosion on the representation 250 of the subterranean region. With each iteration of the erosion algorithm, each voxel labeled as possible hydrocarbon ($sv=1$) is checked to see if it is immediately beside or below a boundary of the representation 250 of the subterranean region or a voxel labeled as not possible hydrocarbon ($sv=2$). If so, the module switches the state variable of the voxel being checked to indicate label that voxel as not possible hydrocarbon ($sv=2$). This simulates the lateral and upward migration of hydrocarbons previously described with respect to FIG. 1. If all of the voxels immediately beside or above the voxel being checked are either barriers ($sv=0$) or possible hydrocarbon ($sv=1$), the anisotropic erosion module leaves the state variable of the voxel being checked unchanged. The module stops iterating when no change in state variables occurs between one iteration and the next iteration.

When iterations are complete, the anisotropic erosion module outputs identification of the voxels labeled as possible hydrocarbons (sv=1) as potential reservoir traps locations. The connectivity clustering module identifies groups of voxels labeled as possible hydrocarbons (sv=1) that are contiguous. Each group of contiguous voxels represents a separate reservoir trap and is assigned a unique reservoir trap identifier. All of the voxels of a specific reservoir trap are assigned a common reservoir trap identifier.

Figure 4G:
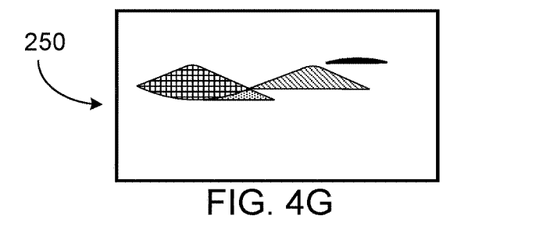

FIG. 4G shows the representation 250 of the subterranean region after the connectivity clustering module has identified and labeled groups of contiguous voxels. Each separate reservoir trap is assigned a unique reservoir trap identifier and indicated with a different shading or color.

The output from the trap identification system can be used as input to a reservoir model. Parameters of the reservoir model provided by the trap identification system can be adjusted based on geological knowledge of formations in the subterranean region. For example, the thickness of hydrocarbon reservoirs in the subterranean formation is influenced by the age of and conditions in the formation. The thickness of the known reservoirs can be extrapolated to the hydrocarbon traps identified by the hydrocarbon trap system. The identified hydrocarbon traps represent formations whose configuration is likely to retain hydrocarbons. However, the areal extent of the possible reservoirs in the hydrocarbon traps is impacted by the reservoir thickness.

Figure 4H:
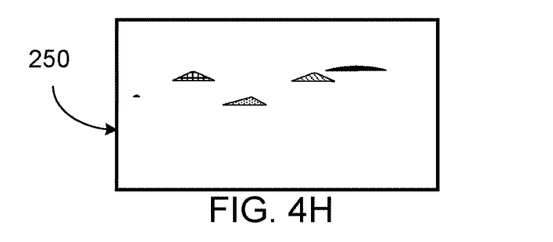

FIG. 4H shows the representation 250 of the subterranean region after the thickness has been adjusted based on the thickness of know reservoirs in the subterranean region or in similar formations. Comparing FIG. 4G and FIG. 4H illustrates how reducing reservoir thickness reduces the areal extent of individual reservoirs. This change is significant because the output from the trap identification system can be used, for example, to identify locations for more detailed analysis of existing seismic data, for additional focused seismic surveys, or to drill a well or wells to a location in the subterranean region corresponding to voxels identified as possible hydrocarbon in the output.

Figure 5:
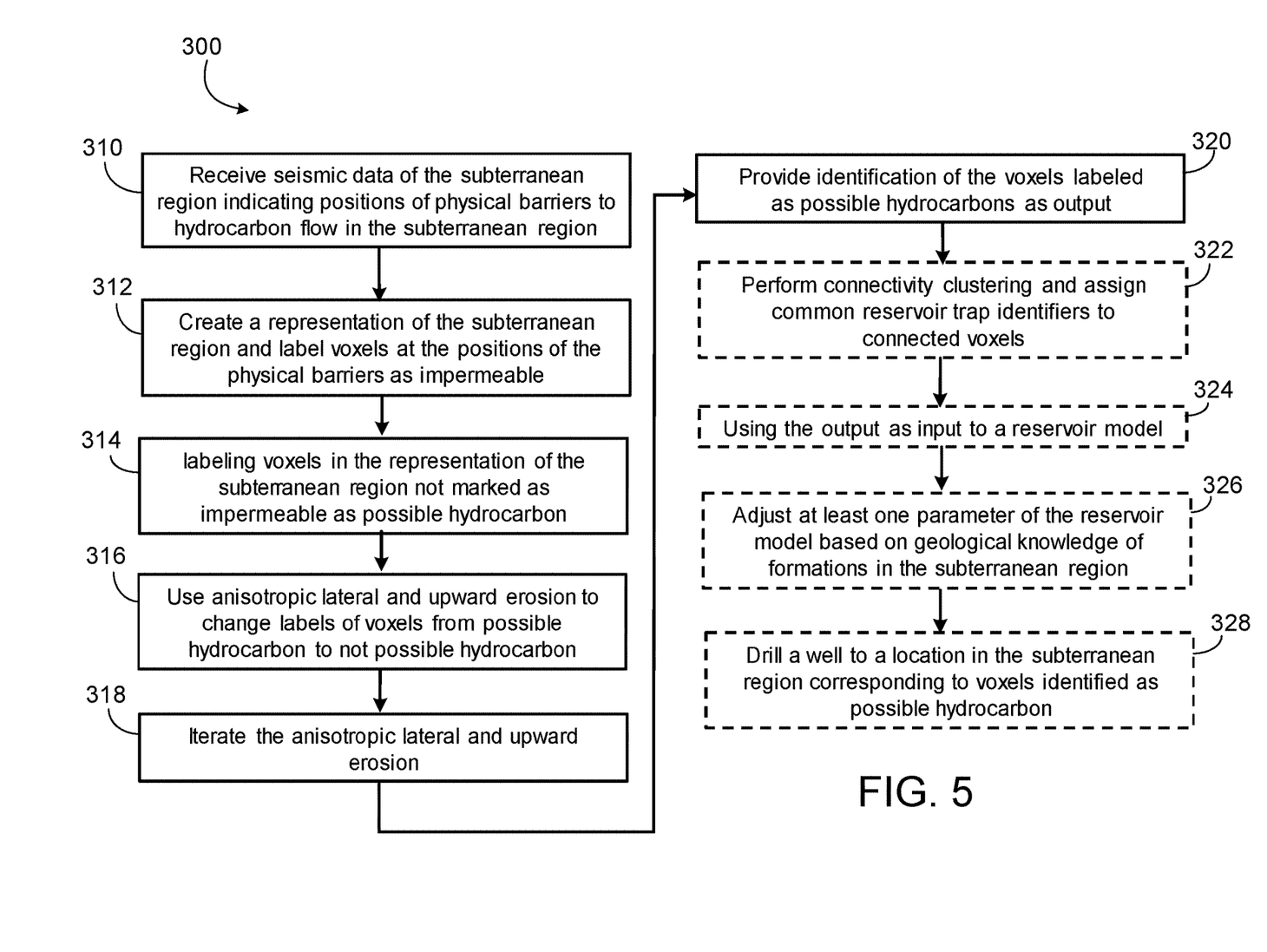
FIG. 5 is a flow diagram of an example process for identifying potential hydrocarbon traps in a subterranean region using recursive anisotropic erosion of seismic data representing the subterranean region.

FIG. 5 is a flow diagram of an example process for identifying potential hydrocarbon traps in a subterranean region using recursive anisotropic erosion of seismic data representing the subterranean region. For convenience, the process 300 will be described as being performed by a system of one or more computers located in one or more locations. For example, a trap identification system, for example, the trap identification system 400 of FIG. 6, appropriately programmed in accordance with this specification, can perform the process 300.

The system receives receiving seismic data of the subterranean region being considered (310). The seismic data, acquired by at least one seismic sensor, indicates positions of physical barriers to hydrocarbon flow in the subterranean region. Physical barriers to hydrocarbon flow in the subterranean region include features such as, for example, faults and horizons that limit flow of hydrocarbons.

Based at least in part on the seismic data, the system creates a representation of the subterranean region and labels voxels at the positions of the physical barriers as impermeable (312). In some implementations, the representation is a two-dimensional representation. In others, the representation is a three-dimensional representation.

The system labels voxels in the representation of the subterranean region not marked as impermeable as possible hydrocarbon (314). The system then uses anisotropic lateral and upward erosion to change labels of voxels from possible hydrocarbon to not possible hydrocarbon (316). The system iterates the anisotropic lateral and upward erosion until no change occurs between one iteration and the next iteration (318). With each iteration of the erosion algorithm, the system checks each voxel labeled as possible hydrocarbon to see if it is immediately beside or below a boundary of the representation of the subterranean region or a voxel labeled as not possible hydrocarbon. If so, the system switches the state variable of the voxel being checked is switched to indicate label that voxel as not possible hydrocarbon. As previously discussed with respect to FIGS. 4C-4F, this process simulates the lateral and upward migration of hydrocarbons previously described with respect to FIG. 1. If all of the voxels immediately beside or above the voxel being checked are either barriers or possible hydrocarbon, the system leaves the state variable of the voxel being checked unchanged. The system stops iterating when no change in state variables occurs between one iteration and the next iteration.

When iterations are complete, the system outputs identification of the voxels labeled as possible hydrocarbons as potential reservoir traps locations (320).

Optionally, the system identifies groups of voxels labeled as possible hydrocarbons that are contiguous (322). The system assigns each group of contiguous voxels representing a separate reservoir trap a unique reservoir trap identifier. All of the voxels of a specific reservoir trap are assigned a common reservoir trap identifier.

Optionally, the system provides the output as input to a reservoir model (324). The system can adjust at least one parameter of the reservoir model based on geological knowledge of formations in the subterranean region (326). For example, the system can adjust reservoir thickness in the reservoir model.

The system can provide output that includes a graphical representation of the voxels identified as possible hydrocarbon in the output. For example, the graphical representation can be a two-dimensional display with a first color representing voxels labeled as not possible hydrocarbon and different color or colors representing possible hydrocarbons.

The trap identification process 300 can also include drilling a well to a location in the subterranean region corresponding to voxels identified as possible hydrocarbon in the output (328) to confirm trap identification.

Figure 6:
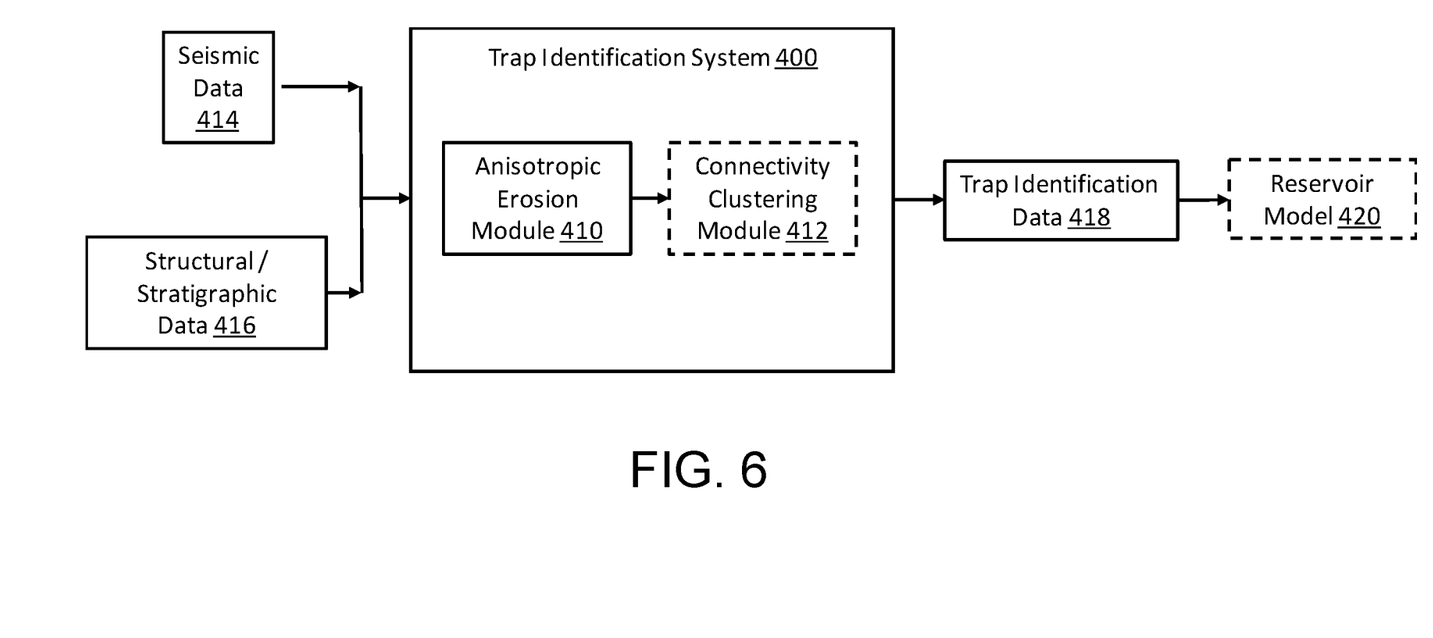
FIG. 6 is a block diagram of an example system implementing the process of FIG. 5.

FIG. 6 is a block diagram of an example system implementing the process of FIG. 5. The trap identification system 400 includes an anisotropic erosion module 410 and, optionally, a connectivity clustering module 412. A seismic survey as described with respect to FIG. 1 and other data acquisition activities generate raw data which is processed. The post-stack seismic data 414 and structural/stratigraphic data 416 resulting from this acquisition and processing is provided to the trap identification system 400 as input. Using the approach described with respect to FIGS. 4A-5, the trap identification system generates trap identification data 418 which can be processed automatically, assessed manually, or both. Optionally, the resulting trap identification data can be provided to other tools for interpreting and using information about the subterranean region such as, for example, a reservoir model 420. A computer system such as the computer system described with respect to FIG. 8 can be used to implement the trap identification system 400 and to handle the associated input and output.

Figure 7A:
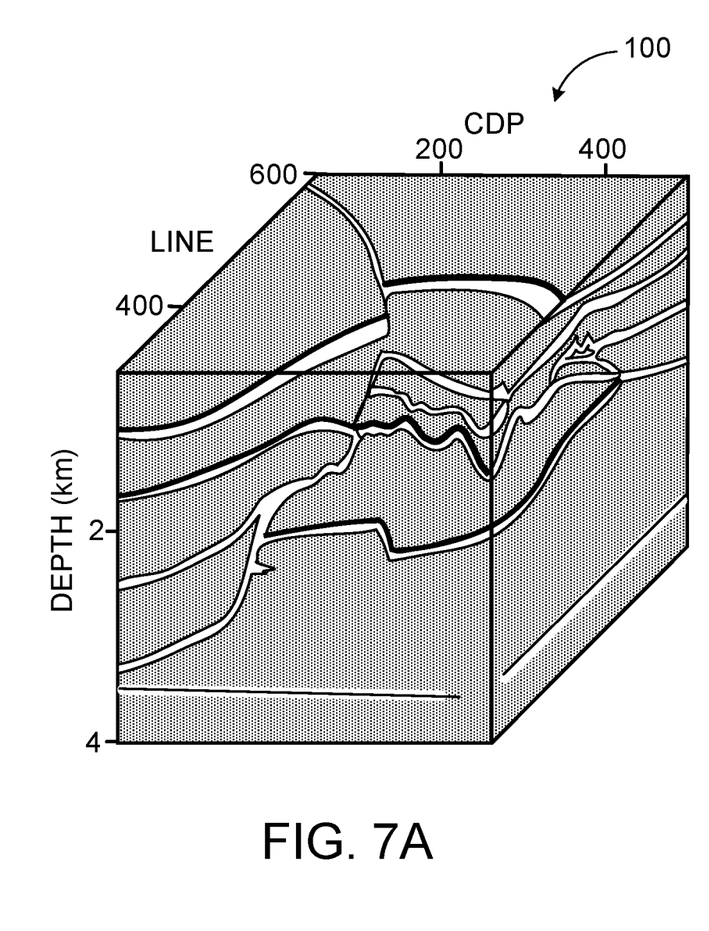
FIG. 7A is an example of a three-dimensional representation of the subterranean region including impermeable barriers and initial labeling of other voxels as possible hydrocarbons.
Figure 7B:
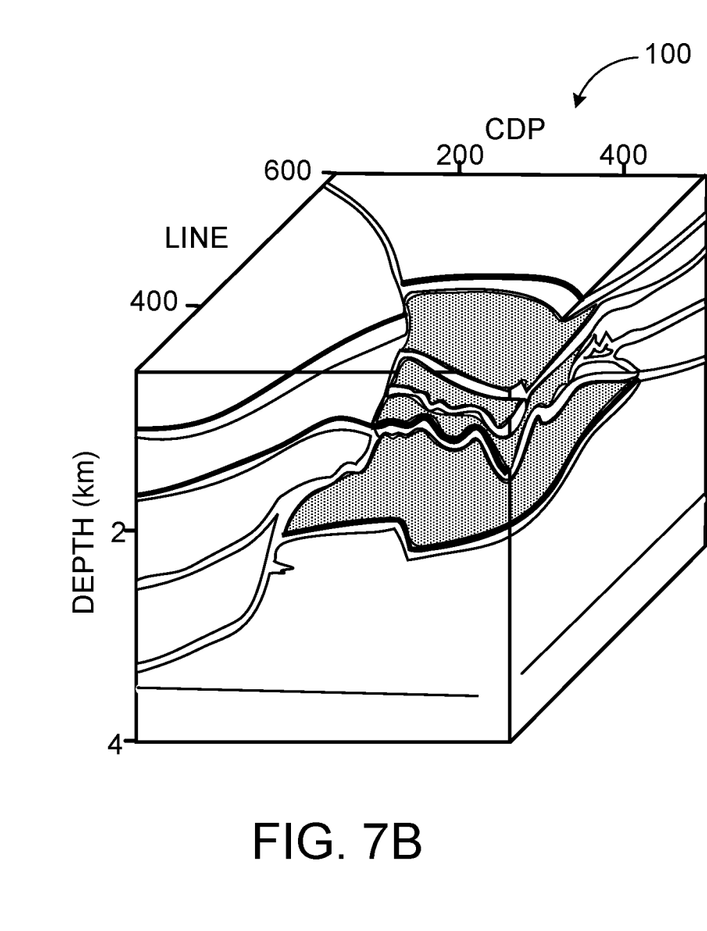
FIG. 7B shows the same three-dimensional representation of the subterranean region after processing by the example anisotropic erosion system of FIG. 6.

FIG. 7A is an example of a three-dimensional representation of the subterranean formation 100 including impermeable barriers and initial labeling of all other voxels as possible hydrocarbons. FIG. 7B shows the same three-dimensional representation of the subterranean formation 100 after processing by the example anisotropic erosion system of FIG. 6. Systems implemented with three-dimensional of the subterranean region being investigated are able to quickly identify hydrocarbon traps that are not easy to assess using the two-dimensional visualizations used in manual identification and not easy to visually represent in three-dimensions.

Figure 8:
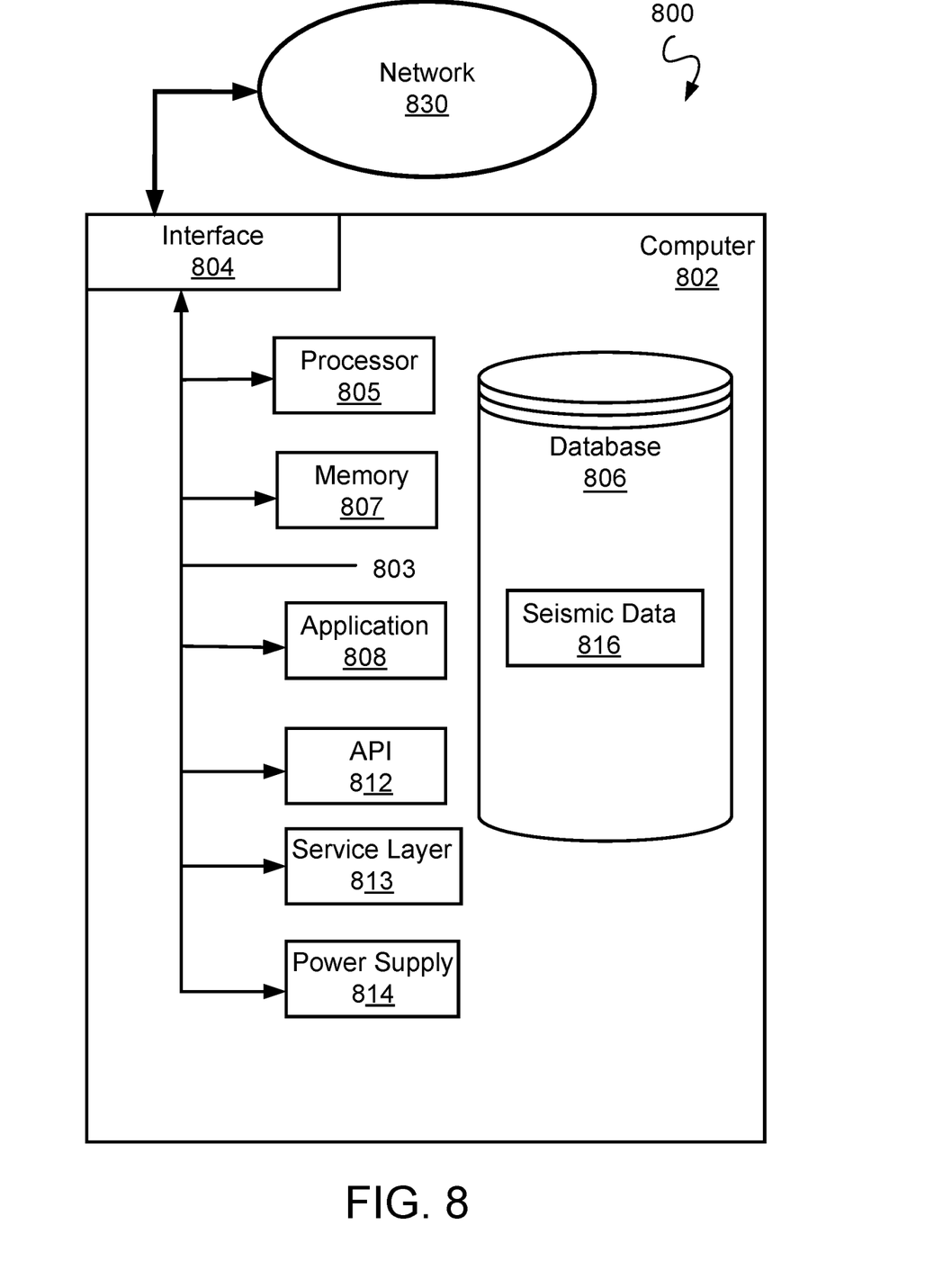
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

Generally, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both), over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data (for example, seismic data 816) for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for identifying potential hydrocarbon traps in a subterranean region implemented by one or more data processing apparatus, the method comprising:
   receiving seismic data of the subterranean region, the seismic data acquired by at least one seismic sensor, the seismic data indicating positions of physical barriers to hydrocarbon flow in the subterranean region;
   creating a representation of the subterranean region and labeling voxels at the positions of the physical barriers as impermeable;
   labeling voxels in the representation of the subterranean region not marked as impermeable as possible hydrocarbon;
   using anisotropic lateral and upward erosion to change labels of voxels from possible hydrocarbon to not possible hydrocarbon;
   iterating the anisotropic lateral and upward erosion until no change occurs between one iteration and the next iteration;
   providing identification of the voxels labeled as possible hydrocarbons as output; and drilling the well to a location in the subterranean region corresponding to voxels identified as possible hydrocarbon in the output.

2. The method of claim 1, further comprising performing connectivity clustering on the voxels labeled as possible hydrocarbons in the output and assigning common reservoir trap identifiers to connected voxels.

3. The method of claim 2, further comprising using the output as input to a reservoir model.

4. The method of claim 3, further comprising adjusting at least one parameter of the reservoir model based on geological knowledge of formations in the subterranean region.

5. The method of claim 4, wherein the at least one parameter of the reservoir model comprises reservoir thickness.

6. The method of claim 1, wherein the representation is a two-dimensional representation.

7. The method of claim 1, wherein the representation is a three-dimensional representation.

8. The method of claim 1, wherein the physical barriers include faults.

9. The method of claim 8, wherein the physical barriers include horizons limiting flow of hydrocarbons.

10. The method of claim 1, wherein the output comprises a graphical representation of the voxels identified as possible hydrocarbon in the output.

11. The method of claim 10, wherein the graphical representation comprises a two-dimensional display with a first color representing voxels labeled as not possible hydrocarbon and a different color or colors representing possible hydrocarbons.

12. A computer-implemented system, comprising:
   a computer memory; and
   a hardware processor interoperably coupled with the computer memory and configured to perform operations comprising:
   receiving seismic data of the subterranean region, the seismic data acquired by at least one seismic sensor, the seismic data indicating positions of physical barriers to hydrocarbon flow in the subterranean region;
   creating a representation of the subterranean region and labeling voxels at the positions of the physical barriers as impermeable;
   labeling voxels in the representation of the subterranean region not marked as impermeable as possible hydrocarbon;
   using anisotropic lateral and upward erosion to change labels of voxels from possible hydrocarbon to not possible hydrocarbon;
   iterating the anisotropic lateral and upward erosion until no change occurs between one iteration and the next iteration;
   providing identification of the voxels labeled as possible hydrocarbons as output; and drilling a well to a location in the subterranean region corresponding to voxels identified as possible hydrocarbon in the output.

13. The system of claim 12, further comprising performing connectivity clustering on the voxels labeled as possible hydrocarbons in the output and assigning common reservoir trap identifiers to connected voxels.

14. The system of claim 13, further comprising using the output as input to a reservoir model.

15. The system of claim 14, further comprising adjusting at least one parameter of the reservoir model based on geological knowledge of formations in the subterranean region.

16. The system of claim 12, wherein the representation is a three-dimensional representation.

17. The system of claim 12, wherein the physical barriers include faults.

18. The system of claim 17, wherein the physical barriers include horizons limiting flow of hydrocarbons.

19. The system of claim 12, wherein the output comprises a graphical representation of the voxels identified as possible hydrocarbon in the output.

20. The system of claim 19, wherein the graphical representation comprises a two-dimensional display with a first color representing voxels labeled as not possible hydrocarbon and a different color or colors representing possible hydrocarbons.

* * * * *